(12) United States Patent
Buchar et al.

(10) Patent No.: US 6,744,536 B2
(45) Date of Patent: Jun. 1, 2004

(54) DOCUMENT SCANNER HAVING REPLACEABLE BACKING AND AUTOMATIC SELECTION OF REGISTRATION PARAMETERS

(75) Inventors: Wayne A. Buchar, Bloomfield, NY (US); Ramesh Nagarajan, Pittsford, NY (US); Ralph H. Huedepohl, Bloomfield, NY (US); Wooi L. Yeoh, Rochester, NY (US); Robert P. Herloski, Webster, NY (US); Thomas C. McGraw, Macedon, NY (US); William M. Harney, Rochester, NY (US); Jeffrey L. Baniak, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 697 days.

(21) Appl. No.: 09/767,216

(22) Filed: Jan. 22, 2001

(65) Prior Publication Data

US 2002/0126299 A1 Sep. 12, 2002

(51) Int. Cl.[7] ................................................ H04N 1/38
(52) U.S. Cl. ..................... 358/464; 358/488; 358/449; 382/169; 382/274
(58) Field of Search ............................... 358/505, 449, 358/487, 488, 494, 500, 506, 512, 514, 464, 498, 496; 382/169, 274, 275

(56) References Cited

U.S. PATENT DOCUMENTS

| | | | |
|---|---|---|---|
| 3,592,963 A | * 7/1971 | Young ........................ | 358/410 |
| 5,384,621 A | 1/1995 | Hatch et al. ................. | 355/204 |
| 5,408,343 A | * 4/1995 | Sugiura et al. .............. | 358/520 |
| 5,488,464 A | 1/1996 | Wenthe, Jr. et al. ......... | 355/233 |
| 5,528,387 A | 6/1996 | Kelly et al. .................. | 358/488 |
| 5,644,406 A | * 7/1997 | Harrington et al. .......... | 382/239 |
| 5,699,165 A | * 12/1997 | Suzuki et al. ................ | 358/296 |
| 5,748,344 A | 5/1998 | Rees ........................... | 358/505 |
| 5,959,290 A | 9/1999 | Schweid et al. .......... | 250/208.1 |
| 6,078,051 A | 6/2000 | Banton et al. ............ | 250/341.1 |
| 6,122,393 A | 9/2000 | Schweid et al. ............. | 382/112 |
| 6,122,441 A | * 9/2000 | Tsuji ........................... | 358/1.9 |
| 6,166,394 A | 12/2000 | Rubscha ...................... | 250/559 |
| 6,219,147 B1 | * 4/2001 | Ichimura .................... | 358/1.13 |
| 6,259,540 B1 | * 7/2001 | Hsu et al. .................... | 358/474 |
| 6,301,019 B1 | * 10/2001 | Saito et al. .................. | 358/461 |
| 2001/0035984 A1 | * 11/2001 | Kumagai et al. ........... | 358/471 |

* cited by examiner

Primary Examiner—Edward Coles
Assistant Examiner—Heather D Gibbs
(74) Attorney, Agent, or Firm—William Eipert

(57) ABSTRACT

A system and method for determining the registration parameters necessary for registration or edge detection processing to enable the flexibility of changing the color of backing to suit a given application. The method includes scanning the backing surface to obtain at least two sets of gray level values; (b) determining an average gray level for each of the two color channels; (c) selecting a registration channel based on the average gray level; (d) determining a gray level deviation for the registration channel; and (e) determining registration parameters based on the average gray level and the gray level deviation of the registration channel.

19 Claims, 4 Drawing Sheets

DOCUMENT SCANNER HAVING REPLACEABLE BACKING AND AUTOMATIC SELECTION OF REGISTRATION PARAMETERS

BACKGROUND OF THE INVENTION

The present invention relates generally to automatic background detection of a scanned document. More particularly, this invention relates to a system and method wherein edge detection parameters corresponding to the color of a backing ski are automatically selected when a backing ski having a first color is to be replaced with a ski of a different color.

In the reproduction of copies of an original document from video image data created, for example, by electronic input scanning from an original document, it is often desirable to provide functions dependent upon determining the exterior edges of the document. Such features include, for example, automatic magnification, automatic two-up copying, deletion of background image data which falls outside the detected exterior edges of the document to avoid storing a document requiring more space than necessary, automatic location of the document in a scanning system, electronic registration and deskewing of the electronic image, etc. In other words, to provide these features, the exterior edges of the document must somehow be detected by the scanning system.

In addition to the features identified above, the identification of the exterior edges of the document is necessary when scanning a document fed with a constant velocity transport (CVT) device, especially in a center-registered document feeding system. Typically, an edge detection operation is used to determine the arrival of individual input documents as well as to determine the side edges of the document fed into the CVT device so as to set the start/stop coordinates in the fast scan direction and thereby identify the image area for capture and processing. That is, the scanner uses the edge detection operation to determine the presence, exact location, and size of a document being imaged in a CVT device.

As should be appreciated, to provide an edge detection operation the exterior edges of the document must somehow be detected by the scanning system. Conventionally, to achieve the detection of the exterior edges of the original document, digital scanners use a backing (e.g., a platen cover or, in a CVT, a baffle or ski) that is readily distinguishable from the original document. That is, edge detection typically relies on the ability of the digital scanner and/or the image processing system to sense a difference, such as the difference in reflectance between the input document's background and the surrounding backing, e.g., the platen cover, backing plate, baffle, ski, etc. To enable such detection, the document is preferably passed between the scanner and a black (or other dark color) backing. However, backings with a yellow color, a whiter than white color, a backing which fluoresces, and various other alternatives have also been employed.

Although various alternatives have been utilized, it is most desirable to utilize a dark backing when scanning an original document so as to eliminate show through when scanning a double-sided or watermarked document (especially for thin or partially translucent originals). Utilizing a light absorbing backing (e.g., black or dark color) eliminates show through when scanning the document and enables the scanning system or other downstream image processing system to automatically locate the exterior edges of the original document.

However, an undesirable consequence of using a light absorbing backing is that any defect in the original document; such as holes, cuts, rips, dog-ears, etc. or other characteristic properties of the original; such as pre-punched holes, etc.; appear as dark objects (also referred to as a scanning artifact) when they are displayed electronically or rendered and printed on a recording medium, whether they are printed immediately, faxed or subsequently or remotely printed. In the following description, the defects in the original and the characteristic properties of the original will be generally referred to as defects and the corresponding areas in the output document will be referred to as artifacts. However, this notation does not imply that the physical properties of the original are actual defects, just properties that create artifacts in the scanning process which are undesirable.

Various solutions have been proposed to enable accurate edge detection while minimizing show through and removing the scanning artifacts corresponding to holes or similar defects in the scanned image. By having the backing area dark, any area (group of pixels) having a low reflectance value can be considered a potential backing area and thus subject to elimination from the rendered image. However, relying solely on the reflectance value when automatically electronically removing such areas of the scanned-in image is not acceptable since that could also remove actual image data, such as large block printed letter titles, bars, or graphics. Additionally, selectively manually electronically "painting" over such areas would be too time consuming in most cases, even if available. Given the likelihood of producing many false detections, is desirable to have a second criteria to measure in order to provide proper distinction between backing and the actual image on the document.

Various digital image processing systems for recognizing, and eliminating by image processing, artifacts corresponding to defects in the originals by identifying a finely patterned image on the backing surface have been proposed. Examples of such solutions can be found in U.S. Pat. No. 5,384,621 entitled "Document Detection Apparatus" and U.S. Pat. Nos. 5,959,290; 6,078,051 and 6,122,393 directed to an Image Input Device and Method for Providing Scanning Artifact Detection. Generally, these solutions detect the pattern of a backing by recognizing its electronic signature when it images through a hole in the document sheet and replacing the data with values corresponding to the document background on the assumption that actual text data would not have such a pattern. However, customers that do not normally ever image apertured original documents may not want such a feature implemented, and have no need to even risk any image loss.

Another solution to the above problem is described in U.S. Pat. No. 5,748,344 to Rees. Rees discloses the use of two sets of color sensitive sensors (photosites), each set being sensitive to a different color of light and a backing having a predetermined color. The predetermined color of the backing is selected such that it appears nearly black to one set of sensors and appears nearly white to a different set of sensors. For example, the system might include a backing that is a saturated yellow with a set of sensors that is sensitive to blue being used for edge detection and a set of sensors that is sensitive to green being used for image capture. Such a solution can be used with color scanners wherein a single channel (blue) is used for edge detection and registration with all three sensors (red, green, blue) being used for image capture.

The use of backing having a predetermined color provides an easy way to identify document edges and eliminate dark objects corresponding to document defects from the output document in a black and white scanner. However, this solution also has some disadvantages. For example, in many instances the background of the input document may not necessarily be white, such as when scanning a document printed on colored paper or capturing a pictorial or photographic image. In the case of a non-white document background, it becomes difficult to distinguish the document from the backing. Additionally, the use of a colored backing can adversely impact image quality.

Another proposed solution to reduce the reproduction of document defects as dark objects in the output is disclosed commonly assigned U.S. Pat. No. 6,166,394 entitled "Dual Background Document Scanner to Eliminate Hole Printouts" to Robert F. Rubscha. Disclosed therein is a dual mode imaging backing system that includes a substantially dark light absorbing backing surface area and a substantially light reflective backing surface in the same document imaging station as document backing surfaces. The system operates in two modes to automatically provide the dark imaging backing for document edge detection and the light imaging backing to prevent imaging any apertures of any apertured document sheets. The two different imaging backgrounds may be provided by automatically shifting the imaging position between the two adjacent imaging backing surfaces, or by slightly sifting a backing baffle member having the two differently colored areas relative to a fixed position imager. This solution enables the use of a dark backing for most documents with the option to use a light colored backing for eliminating dark objects corresponding to document defects from the output document. However, such a solution increases the complexity and cost of the reproduction system. Additionally, as discussed above, the use of a can adversely impact image quality and not be suitable for the case of a non-white document background.

SUMMARY OF THE INVENTION

In accordance with one aspect of the present invention, there is provided an improved document handler and imaging system, wherein different document sheets are sequentially moved past an imaging station by a document feeding system to be illuminated by a document illumination source and imaged by a document imager in the document imaging station, wherein the document imaging station includes a document backing surface having a selected color and a scanning sensor having at least two color sensitive channels and wherein at least one edge of a document sheet is detected in said document imaging station by said document imager, the improvement comprising: a registration parameter detection circuit; the registration parameter detection circuit receiving a set of gray level values for the backing surface from each of the at least two color sensitive channels and automatically determining an average gray level of the backing surface for each of the at least two sensitive channels; the registration parameter detection circuit automatically selecting a registration channel based on the average gray level for each of the at least two sensitive channels and determining a gray level deviation for the registration channel; and the registration parameter detection circuit automatically determining registration parameters based on the average gray level and the gray level deviation of the registration channel.

In accordance with another aspect of the present invention, there is provided a method of automatically detecting registration parameters for a selected backing surface. The method includes (a) scanning the backing surface to obtain at least two sets of gray level values for the backing surface, the two sets of gray level values including a first set of gray level values comprising a gray level value for selected pixel locations along a scanline for a first color channel and a second set of gray level values comprising a gray level value for selected pixels locations along a scanline for a second color channel; (b) determining an average gray level for each of the two color channels; (c) selecting a registration channel based on the average gray level; (d) determining a gray level deviation for the registration channel; and (e) determining registration parameters based on the average gray level and the gray level deviation of the registration channel.

In accordance with another aspect of the present invention, there is provided an improved document handler and imaging system, wherein document sheets are moved past an imaging station by a document feeding system including rollers coupled to a shaft to be illuminated by a document illumination source and imaged by a document imager in the document imaging station, wherein the document imaging station includes a scanning sensor having at least two color sensitive channels and wherein at least one edge of a document sheet is detected in said document imaging station by said document imager. The improved document handler and imaging system including a detachable backing surface connected to the shaft in a manner to permit the shaft to freely rotate; and a registration parameter detection circuit. The registration parameter detection circuit receiving a set of gray level values for the backing surface from each of the at least two color sensitive channels and automatically determining an average gray level of the backing surface for each of the at least two sensitive channels; selecting a registration channel based on the average gray level for each of the at least two sensitive channels and determining a gray level deviation for the registration channel; and determining registration parameters based on the average gray level and the gray level deviation of the registration channel.

DETAILED DESCRIPTION OF THE INVENTION

Figure 1:
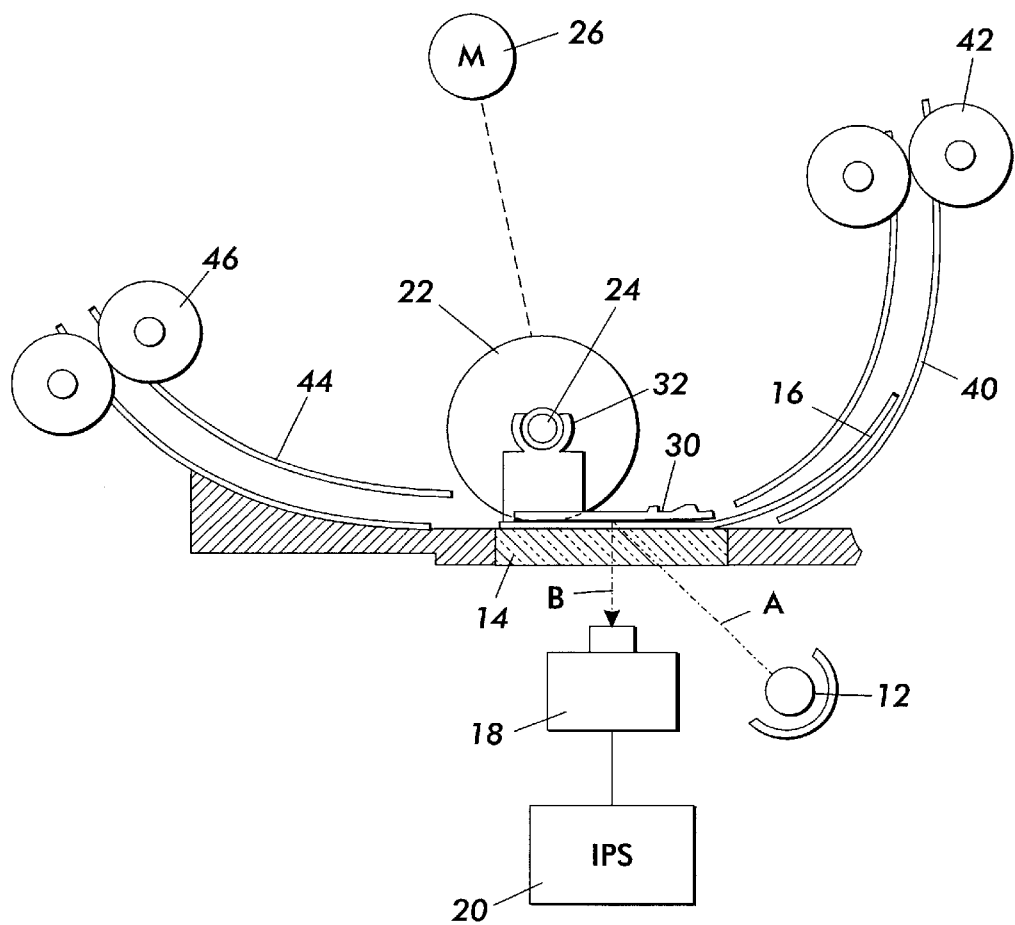
FIG. 1 is a schematic view of a portion of a CVT document handling and digital imaging system incorporating features of the present invention.

The following will be a detailed description of the drawings illustrating the present invention. In this description, as well as in the drawings, like referenced numbers represent devices, circuits, or equivalent circuits which perform the same or equivalent functions. While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

In the following description, the terms fastscan direction and slowscan direction are utilized. Fastscan direction refers to the scanning of pixels along a scanline or raster. This is also commonly referred to as the electronic scan in that the scanning is a result of collecting image data from an array of photoelectric sensors. Slowscan direction, on the other hand, refers to the direction of the relative movement between the document and the scanning system. This is the mechanical movement that causes the scanning system to generate scanlines of image data.

In the description herein the term "document" refers to image bearing sheet being imaged, and "sheet" refers to a usually flimsy physical sheet of paper, plastic, or other suitable physical substrate for images. A "copy sheet" may be abbreviated as a "copy", or called a "hardcopy". A "job" is normally a set of related sheets, usually a collated copy set copied from a set of original document sheets or electronic document page images, from a particular user, or otherwise related.

As noted above, when scanning documents utilizing a digital scanning system, it is desirable to utilize a light absorbing (e.g., black or dark) backing so as to eliminate show through and to enable automatic location and orientation of the original being scanned, thereby enabling autoregistration and electronic deskewing processes to be performed. Furthermore, as noted above, a problem with utilizing a dark backing for copying occurs when documents have defects such as holes, rips, or dog ears. For example, if a document contains punched holes, the areas corresponding to the punched holes will become black on the copy if a black backing is utilized. This is due to the fact that the captured image has the backing area's gray value (black) wherever the hole is present in the original document. Various systems and methods have been proposed to eliminate these artifacts. These solutions have met with varying degrees of success for selected situations.

To resolve this problem, the present invention proposes a reproduction system wherein the backing skis in a CVT system are readily detachable to allow a user to select an appropriate ski for use with a given application. Briefly reviewing, the ski in a CVT system of a digital scanner beneficially covers the entire imaging area of the input scanner. An input document covers a portion of the ski (in the fastscan direction) as it travels the scanning path (slowscan) past the input scanner. Conventionally, edge detection operations look for transitions between the backing ski and the document. To enable accurate edge detection, the present invention further provides for automatically loading a suitable set of parameters for edge detection processing for the given ski.

One common method of edge detection (electronic registration) in digital scanners is performed by looking for a "black-to-white" and "white-to-black" transitions. As used herein, black refers to the ski as many scanners use a backing that appears black to one channel of a scanner, and white refers to the input document since the luminance of the document typically much higher (whiter) than the color of the ski. With such a method, the accuracy of the document edge detection depends on three registration parameters: Black Average Register (BAR), White Average Register (WAR), and Step Change Register (SCR). The BAR identifies a black level threshold wherein input video having a gray level less than (i.e., darker or blacker) the value in this register as treated as being outside the document. The WAR identifies a white level threshold wherein input video having a gray level greater (i.e., lighter or whiter) than the value in this register as treated as being inside the document. The SCR identifies a value wherein input video having a change over N pixels (measured as the absolute difference between average of N/2 darkest pixels and the N/2 lightest pixels) greater than the SCR value is treated as an edge.

Turning now to FIG. 1, there is illustrated a portion of a constant velocity transport (CVT) document handler and imaging system 10 operable in accordance with the teachings of the present invention. Merely by way of one example, a complete description of CVT document feeding system with which an embodiment of the subject invention may be utilized is described and shown in U.S. Pat. No. 5,488,464, issued Jan. 30, 1996 to Steven J. Wenthe, Jr., et al. and incorporated herein by reference.

Returning to FIG. 1, illumination source 12 generates light A which passes through platen glass 14 and is reflected off document 16 as reflected light B which is then received by sensor 18. Beneficially, sensor 18 comprises a raster input scanner (RIS) having a length, transverse to the page, sufficient to scan the entire width of the largest document supported by the handler. RIS 18 receives the reflected light B and converts the reflected light into video data identifying the particular gray level value (e.g., a value from 0 to 255 for an eight bit system wherein a gray level of 0 represents black and a gray level of 255 represents white), for each pixel across the scanline. The video data is supplied to image processing system (IPS) 20 which operates on the image data to identify registration parameters in a manner described below.

Document 16 is passed over sensor 18 (platen glass 14) by roller 22 on roller shaft 24 driven by motor 26. The CVT system includes a baffle 30 (also commonly referred to as a CVT ski), positioned to support document 16 against or in close proximity to the platen glass and provide a suitable image backing. As should be appreciated, to provide a suitable backing, the skis should cover the entire sensor (RIS) 18. That is, the length of the ski in the fastscan direction should be at least equal to the length of the RIS. In accordance with aspects of the present invention, baffle 30 includes one or more shaft clips 32 which enable the ski to be readily attached to or detached from roller shaft 24. The CVT system further includes chute 40 and rollers 42 to guide the original document to roller 22. Chute 44 directs the document away from roller 22 to rollers 46 which operate to carry the original document from roller 22.

Figure 2:
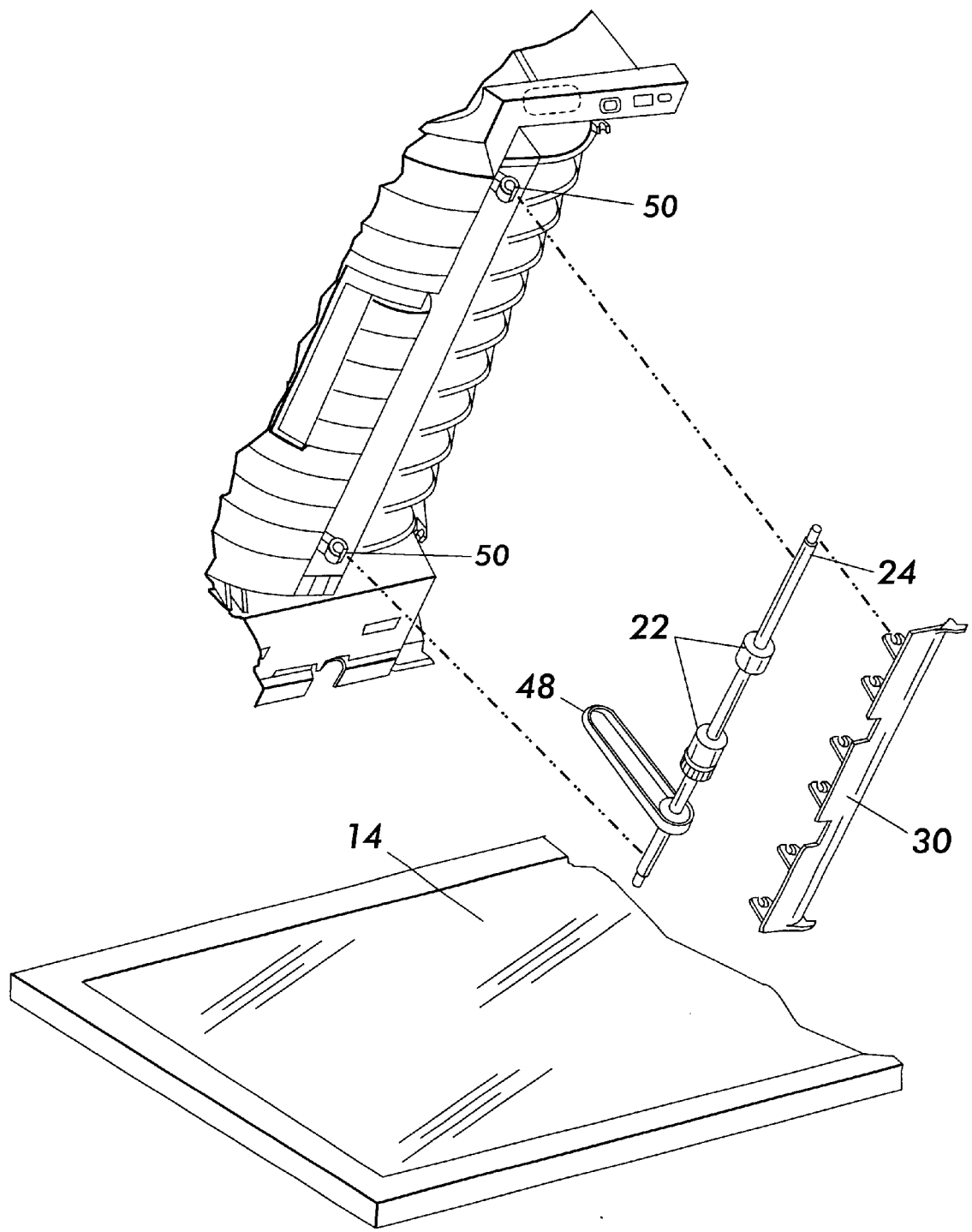
FIG. 2 is a perspective view of a CVT document handling system including a detachable ski in accordance with aspects of the present invention.

FIG. 2 illustrates one example of a detachable, snap-on engagement of CVT ski 30 with roller shaft 24. The embodiment of FIG. 2 includes two rollers 22 on a common roller shaft 24. Beneficially, the two rollers 22 are spaced axially along roller shaft 24 so as to both be within the width of the narrowest document sheet to be fed, yet spaced far enough apart to ensure two distinctly spaced contact areas with every document. Roller shaft 24 is shown as being driven by belt 48; however, it is understood that belt 48 may be replaced by various alternatives including, for example, a toothed belt, a chain, one or more gears, etc. Roller shaft 24 is shown as being coupled to the CVT document handler using clips 50.

Figure 3:
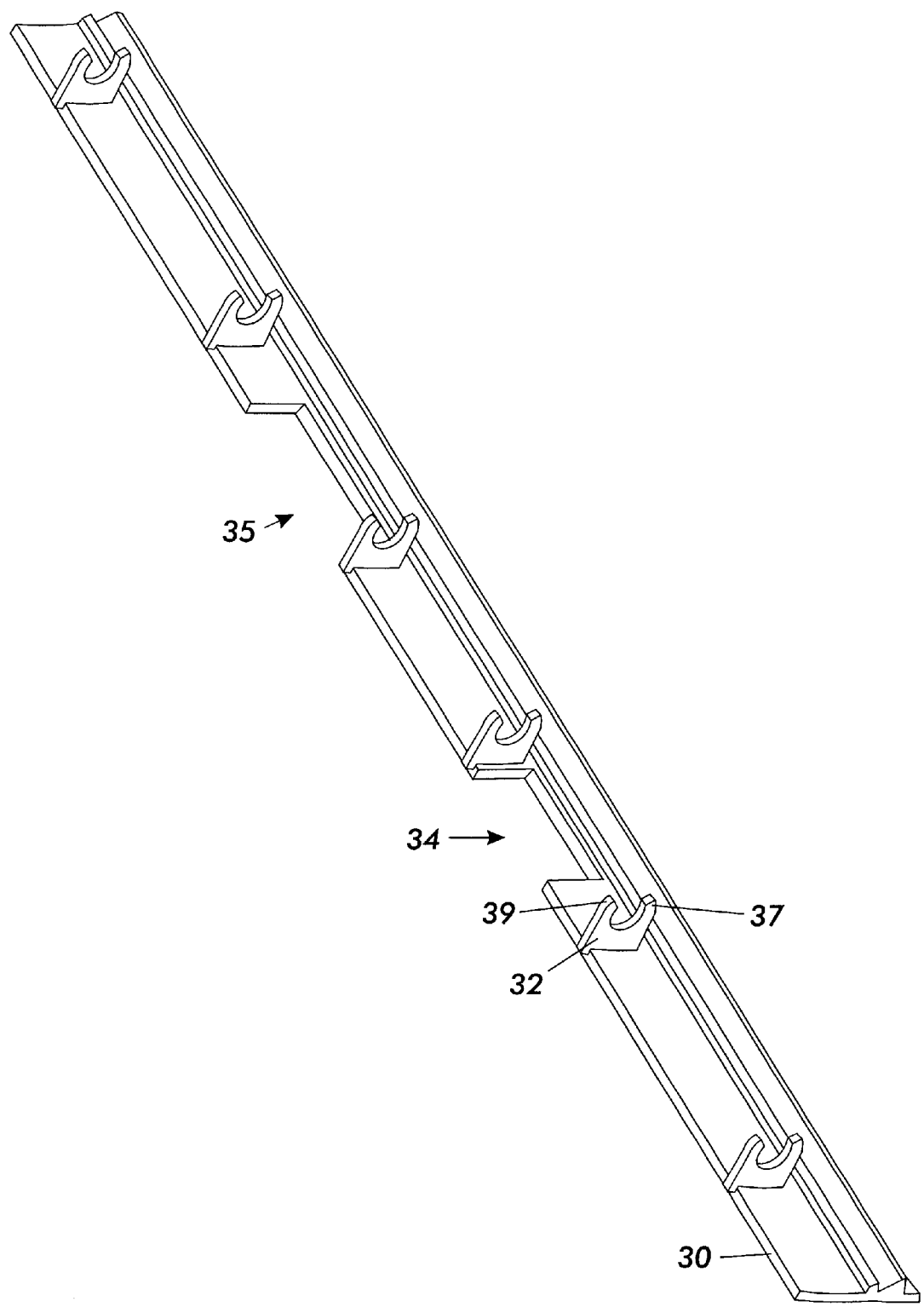
FIG. 3 is a perspective view of a detachable CVT ski in accordance with aspects of the present invention.

CVT ski 30, which is shown in detail in FIG. 3, is shown as having six shaft clips 32 and a pair of spaced notches 34, 35 positioned to correspond with rollers 22 to thereby enable the rollers to drive the input sheet past sensor 18. Each shaft clip comprises a pair of opposing ears 37, 39 defining an opening for engaging the roller shaft. The ears are deformable, enabling the clips to snap on to and off of the shaft while allowing the freely rotate when fully engaged in the shaft clips. As will be apparent to those skilled in the art, alternatives to shaft clips 32, such as a clamp or the like, may be used to detachably connect ski 30 to the roller shaft while permitting the shaft to freely rotate.

As described above, aspects of the present invention provide a CVT document handler and imaging system wherein the backing skis are readily detachable to allow a user to select and change to an appropriate ski for use with a given application without requiring the user to change software or reprogram scanning parameter values. That is, the system automatically loads a suitable set of registration parameters for edge detection processing for the given ski.

Figure 4:
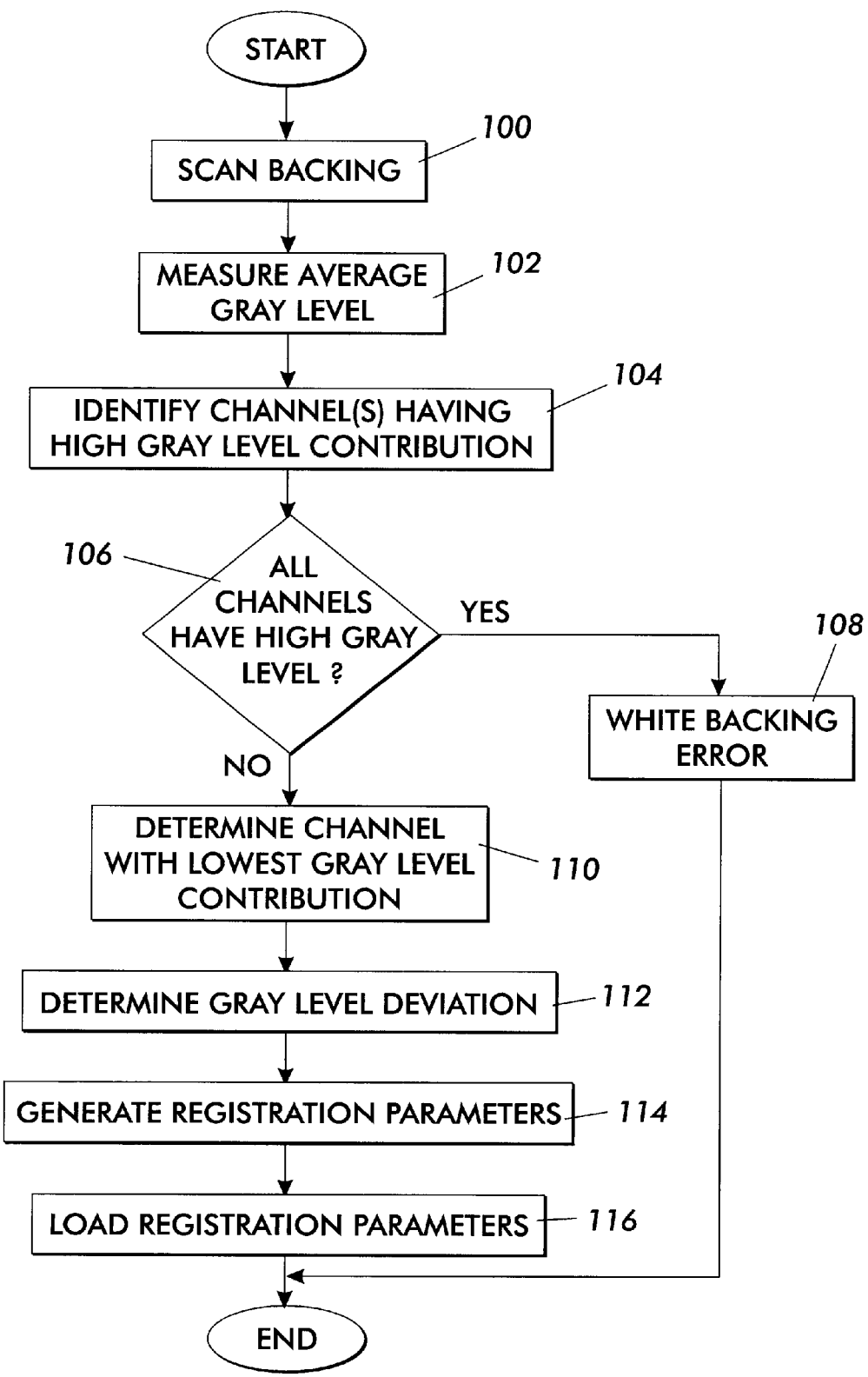
FIG. 4 is a flowchart illustrating an embodiment of a process for determining registration parameters for a given ski in accordance with the present invention.

Turning now to FIG. 4, there is shown a flowchart illustrating the steps in an embodiment of a process to accomplish the automatic loading of a suitable set of parameters for edge detection processing for the given ski. The process begins at step 100 by scanning the CVT ski with sensor 18. The scan provides the gray level value P of each pixel in the scanline for each channel (e.g., Red, Green, Blue) for the ski installed in the scanner. That is, if the scanline contains N pixels, step 100 provides three sets of gray level values $Rp_i$, $Gp_i$, $Bp_i$ for i=1 to N. In step 102, the average gray level contribution for each of the RGB channels is computed. The average gray level for each channel provides an indication of the color of the ski. Beneficially, the average gray level contribution of each RGB channel ($\mu_R, \mu_G, \mu_B$) is generated using the gray level value from each pixel across the scanline. That is:

$$\mu_R = \Sigma_1^N (Rp_i/N)$$
$$\mu_G = \Sigma_1^N (Gp_i/N)$$
$$\mu_B = \Sigma_1^N (Bp_i/N) \quad (1)$$

However, the average gray level values $\mu_R$, $\mu_G$ and $\mu_B$ can be computed using a sampling or subset of pixels across the scanline.

Using the computed average gray level values $\mu_R$, $\mu_G$ and $\mu_B$, the process, at step 104 identifies the channel or channels having the a high average gray level contribution (high luminance values). At step 106, the process determines if all three channels have luminance values above an upper threshold. That is, step 106 determines if the ski looks "white" to each channel. If so, the process provides an error message indicating that the installed ski is not suitable for registering documents (step 108). Alternatively, if the scanning system is designed to performing edge detection operation using a white or whiter than white backing, step 108 enables the system to perform such an operation by, for example, loading the appropriate parameters and processing routines into the image processing system.

On the other hand, if one or more channels do not have high luminance values, the process continues with step 110 wherein the channel with the lowest average gray level is identified. As noted above, it is desirable to have the backing area either a dark color or black. By having the backing area dark, any pixel having a low reflectance value (low gray level contribution) can be considered a potential backing pixel. With edges being identified as a large, sharp variation of the gray levels across the pixels. Thus, the channel with the least gray level contribution will be used for document edge detection.

Once the channel (or channels) to be used for registration are identified, the process determines the gray level deviation of the ski in that channel (or channels) in step 112. The gray level deviation is the difference between the maximum and minimum gray level received in a given for the scan. The gray level deviation provides a measure of the variability across the ski which aids in calculating the registration parameters necessary for document detection.

For purposes of describing the invention, it will be assumed that the backing ski has a yellow or green-yellow color. With such a backing, the blue channel would yield the lowest gray level values and, thus be used for registration. However, it should be understood that the ski can be any color including, for example, reddish, greenish, yellowish, greenish-yellow, bluish, bluish-purple, cyanish, magentaish, etc. Assuming the blue channel is used for registration, step 112 generates the gray level deviation $\Delta_B$ as difference between the maximum gray level and minimum gray level in the blue channel $$\Delta_B = \text{maximum gray level} - \text{minimum gray level} \quad (2)$$

Having generated the gray level deviation for the detection channel at step 112, step 114 generates the three registration parameters: BAR, WAR and SCR according to the following equations:

$$BAR = \begin{matrix} \mu_B & \text{if } \mu_B \geq \delta_1 \\ \delta_1 & \text{if } \mu_B < \delta_1 \end{matrix} \quad (3)$$

$$SCR = \begin{matrix} \Delta_B & \text{if } \Delta_B \geq \delta_2 \\ \delta_2 & \text{if } \Delta_B < \delta_2 \end{matrix} \quad (4)$$

$$WAR = \begin{matrix} \mu_B + \Delta_B & \text{if } \mu_B + \Delta_B \geq \delta_3 \\ \delta_3 & \text{if } \mu_B + \Delta_B < \delta_3 \end{matrix} \quad (5)$$

wherein $\delta_1$ is the minimum black threshold level, $\delta_2$ is the minimum step change level and $\delta_3$ is the minimum white threshold level required for detection processing.

At step 116, the three registration parameters, BAR, WAR and SCR, are loaded into the appropriate registers in the document edge detection operation. Then, when a document is scanned, the appropriate channel would be used for registration/detection processing using the set parameters stored loaded in the registers.

The process for determining and loading registration parameters must be performed at least each time the ski is replaced. This can be accomplished by providing a user option for initiating a ski calibration procedure for determining and loading registration parameters; automatically performing the operation on power-up; performing the operation before each scan from the CVT; or through any combination of the foregoing.

Thus, what has been described is a system and method for determining the channel(s) used for registration or edge detection processing and determining the registration parameters to enable the flexibility of changing skis to suit a given application without having to load new software into the scanning and image processing system. Furthermore, the determination of appropriate registration parameters for a given ski can be used to "calibrate" the scanning system to account for variations in ski color such as may result from manufacturing process (color may vary from one lot to the next), from fading of the ski, or from dirtying of the ski through use.

Although the present invention has been described in detail above, various modifications can be implemented without imparting from the spirit. For example, the present invention has been described with respect to a black and white system. However, the concepts of the present invention can be extended to a color application. Moreover, the present invention has been described with respect to a system having 255 gray levels. However, the system can be easily applicable to any number of gray levels.

While the present invention has been described with reference to various embodiments disclosed above, it is not confined to the details to support the above, but is intended to cover such alternatives, modifications, and variations as may come within the scope of the attached claims.

What is claimed is:

1. In a document handler and imaging system, wherein different document sheets are sequentially moved past an imaging station by a document feeding system to be illuminated by a document illumination source and imaged by a document imager in the document imaging station, wherein the document imaging station includes a document backing surface having a selected color and a scanning sensor having at least two color sensitive channels and wherein at least one edge of a document sheet is detected in said document imaging station by said document imager, the improvement comprising:

a registration parameter detection circuit, the registration parameter detection circuit receiving a set of gray level values for the backing surface from each of the at least two color sensitive channels and automatically determining an average gray level of the backing surface for each of the at least two sensitive channels;

the registration parameter detection circuit automatically selecting a registration channel based on the average gray level for each of the at least two sensitive channels and determining a gray level deviation for the registration channel; and the registration parameter detection circuit automatically determining registration parameters based on the average gray level and the gray level deviation of the registration channel.

2. The document handler and imaging system of claim 1, wherein the registration parameter detection circuit determines the gray level deviation for the registration channel as the difference between the maximum gray level value within the set of gray level values corresponding to the registration channel and the minimum gray level value within the set of gray level values corresponding to the registration channel.

3. The document handler and imaging system of claim 1, wherein the registration parameter detection circuit determines a registration parameter for a black average register (BAR) as a function of the average gray level of the registration channel, a step change register (SCR) as a function of the gray level deviation of the registration channel, and white average register (WAR) as a function of as both the average gray level and the gray level deviation of the registration channel.

4. The document handler and imaging system of claim 3, wherein the registration parameter detection circuit determines the registration parameter for the black average register (BAR) according to $$BAR = \begin{matrix} \mu_R & \text{if } \mu_R \geq \delta_1 \\ \delta_1 & \text{if } \mu_R < \delta_1 \end{matrix},$$

the registration parameter for the a step change register (SCR) according to $$SCR = \begin{matrix} \Delta_R & \text{if } \Delta_R \geq \delta_2 \\ \delta_2 & \text{if } \Delta_R < \delta_2 \end{matrix},$$

and the registration parameter for white average register (WAR) according to $$WAR = \begin{matrix} \mu_R + \Delta_R & \text{if } \mu_R + \Delta_R \geq \delta_3 \\ \delta_3 & \text{if } \mu_R + \Delta_R < \delta_3 \end{matrix}$$

wherein $\delta_1$ is the minimum black threshold level, $\delta_2$ is the minimum step change level, $\delta_3$ is the minimum white threshold level required for detection processing, $\Delta_R$ is the gray level deviation for the registration channel and $\mu_R$, is the average gray level of the registration channel.

5. A method of automatically detecting registration parameters for a selected backing surface, comprising:

(a) scanning the backing surface to obtain at least two sets of gray level values for the backing surface, the two sets of gray level values including a first set of gray level values comprising a gray level value for selected pixel locations along a scanline for a first color channel and a second set of gray level values comprising a gray level value for selected pixels locations along a scanline for a second color channel;

(b) determining an average gray level for each of the two color channels;

(c) selecting a registration channel based on the average gray level;

(d) determining a gray level deviation for the registration channel; and (e) determining registration parameters based on the average gray level and the gray level deviation of the registration channel.

6. The method of claim 5, further comprising providing a backing surface having a color being one of yellow, greenish-yellow, green and black.

7. The method of claim 6, wherein the backing surface comprises a ski, the ski being adapted to be removably attached to a document handler.

8. The method of claim 5, wherein of step (c) selects the channel having the lowest average gray level as the registration channel.

9. The method of claim 5, wherein of step (d) determines the gray level deviation for the registration channel as the difference between the maximum gray level value within the set of gray level values corresponding to the registration channel and the minimum gray level value within the set of gray level values corresponding to the registration channel.

10. The method of claim 5, wherein of step (e) comprises:

(e1) determining a registration parameter value for a black average register (BAR) as a function of the average gray level of the registration channel;

(e2) determining a registration parameter value for a step change register (SCR) as a function of the gray level deviation of the registration channel; and (e3) determining a registration parameter value for a white average register (WAR) as a function of as both the average gray level and the gray level deviation of the registration channel.

11. The method of claim 10, wherein of step (e1) determines the registration parameter value for the black average register (BAR) according to $$BAR = \begin{matrix} \mu_R & \text{if } \mu_R \geq \delta_1 \\ \delta_1 & \text{if } \mu_R < \delta_1 \end{matrix},$$

wherein $\delta_1$ is a minimum black threshold level and $\mu_R$, is the average gray level of the registration channel.

12. The method of claim 10, wherein of step (e2) determines the registration parameter value for the step change register (SCR) according to $$SCR = \begin{matrix} \Delta_R & \text{if } \Delta_R \geq \delta_2 \\ \delta_2 & \text{if } \Delta_R < \delta_2 \end{matrix}$$

wherein $\delta_2$ is a minimum step change level and $\Delta_R$ is the gray level deviation for the registration channel.

13. The method of claim 10, wherein of step (e3) determines the registration parameter value for the white average register (WAR) according to $$WAR = \begin{matrix} \mu_R + \Delta_R & \text{if } \mu_R + \Delta_R \geq \delta_3 \\ \delta_3 & \text{if } \mu_R + \Delta_R < \delta_3 \end{matrix}$$

wherein $\delta_3$ is a minimum white threshold level required for detection processing, $\Delta_R$ is the gray level deviation for the registration channel and $\mu_R$, is the average gray level of the registration channel.

14. In a document handler and imaging system, wherein different document sheets are sequentially moved past an imaging station by a document feeding system including rollers coupled to a shaft to be illuminated by a document illumination source and imaged by a document imager in the document imaging station, wherein the document imaging station includes a scanning sensor having at least two color sensitive channels and wherein at least one edge of a document sheet is detected in said document imaging station by said document imager, the improvement comprising:
 a detachable backing surface, the backing surface being detachably connected to the shaft in a manner to permit the shaft to freely rotate; and
 a registration parameter detection circuit,
 the registration parameter detection circuit receiving a set of gray level values for the backing surface from each of the at least two color sensitive channels and automatically determining an average gray level of the backing surface for each of the at least two sensitive channels;
 the registration parameter detection circuit automatically selecting a registration channel based on the average gray level for each of the at least two sensitive channels and determining a gray level deviation for the registration channel; and
 the registration parameter detection circuit automatically determining registration parameters based on the average gray level and the gray level deviation of the registration channel.

15. The document handler and imaging system of claim 14, wherein the backing surface includes a shaft clip to detachably connect the backing surface to the shaft.

16. The document handler and imaging system of claim 15, wherein the backing surface includes a set of spaced notches positioned to correspond with the rollers.

17. The document handler and imaging system of claim 15, wherein the registration parameter detection circuit determines the gray level deviation for the registration channel as the difference between the maximum gray level value within the set of gray level values corresponding to the registration channel and the minimum gray level value within the set of gray level values corresponding to the registration channel.

18. The document handler and imaging system of claim 15, wherein the registration parameter detection circuit determines a registration parameter for a black average register (BAR) as a function of the average gray level of the registration channel, a step change register (SCR) as a function of the gray level deviation of the registration channel, and white average register (WAR) as a function of as both the average gray level and the gray level deviation of the registration channel.

19. The document handler and imaging system of claim 18, wherein the registration parameter detection circuit determines the registration parameter for the black average register (BAR) according to $$BAR = \begin{matrix} \mu_R & \text{if } \mu_R \geq \delta_1 \\ \delta_1 & \text{if } \mu_R < \delta_1 \end{matrix},$$

the registration parameter for the a step change register (SCR) according to $$SCR = \begin{matrix} \Delta_R & \text{if } \Delta_R \geq \delta_2 \\ \delta_2 & \text{if } \Delta_R < \delta_2 \end{matrix}$$

and the registration parameter for white average register (WAR) according to $$WAR = \begin{matrix} \mu_R + \Delta_R & \text{if } \mu_R + \Delta_R \geq \delta_3 \\ \delta_3 & \text{if } \mu_R + \Delta_R < \delta_3 \end{matrix}$$

wherein $\delta_1$ is the minimum black threshold level, $\delta_2$ is the minimum step change level, $\delta_3$ is the minimum white threshold level required for detection processing, $\Delta_R$ is the gray level deviation for the registration channel and $\mu_R$, is the average gray level of the registration channel.

* * * * *